UNITED STATES PATENT OFFICE.

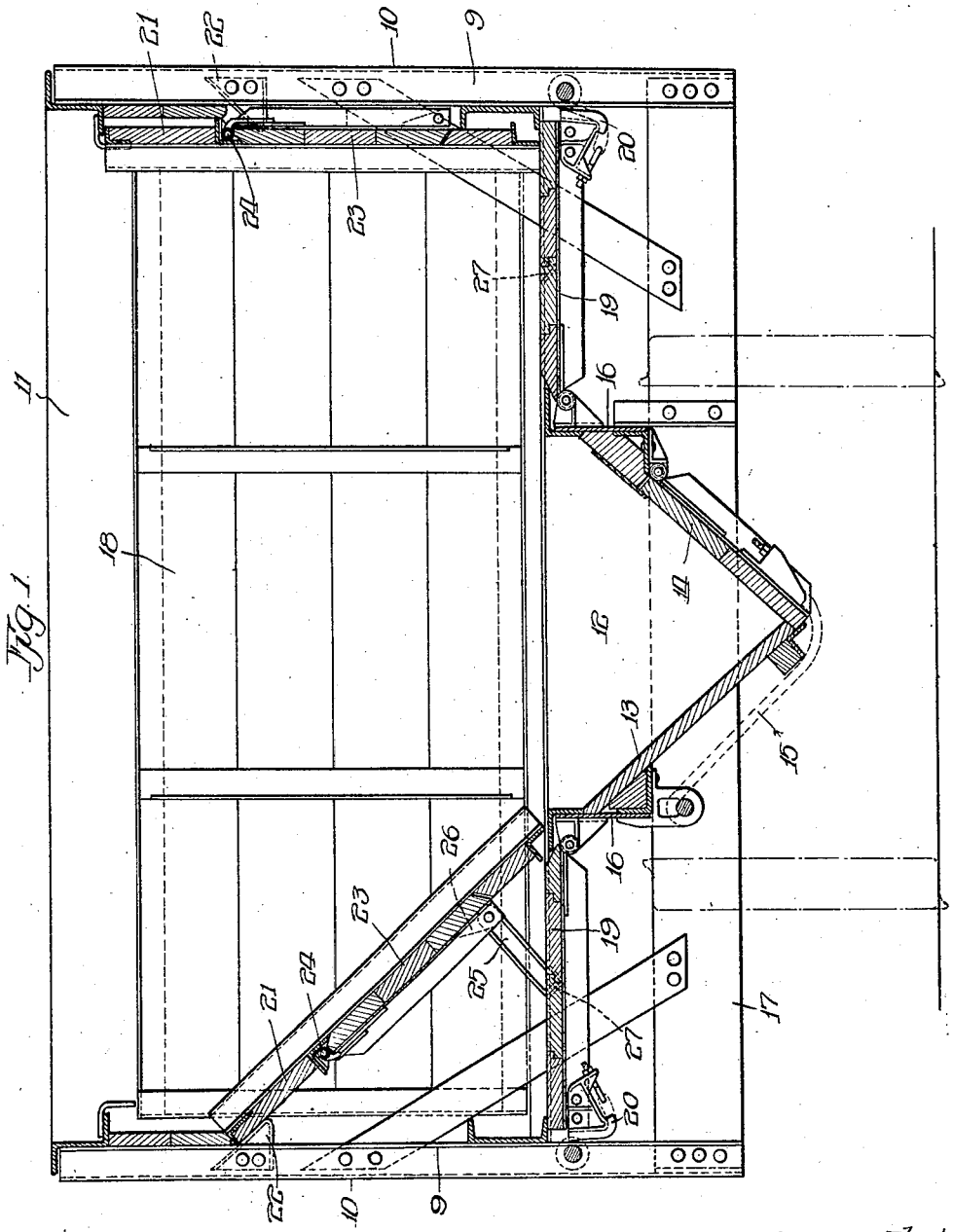

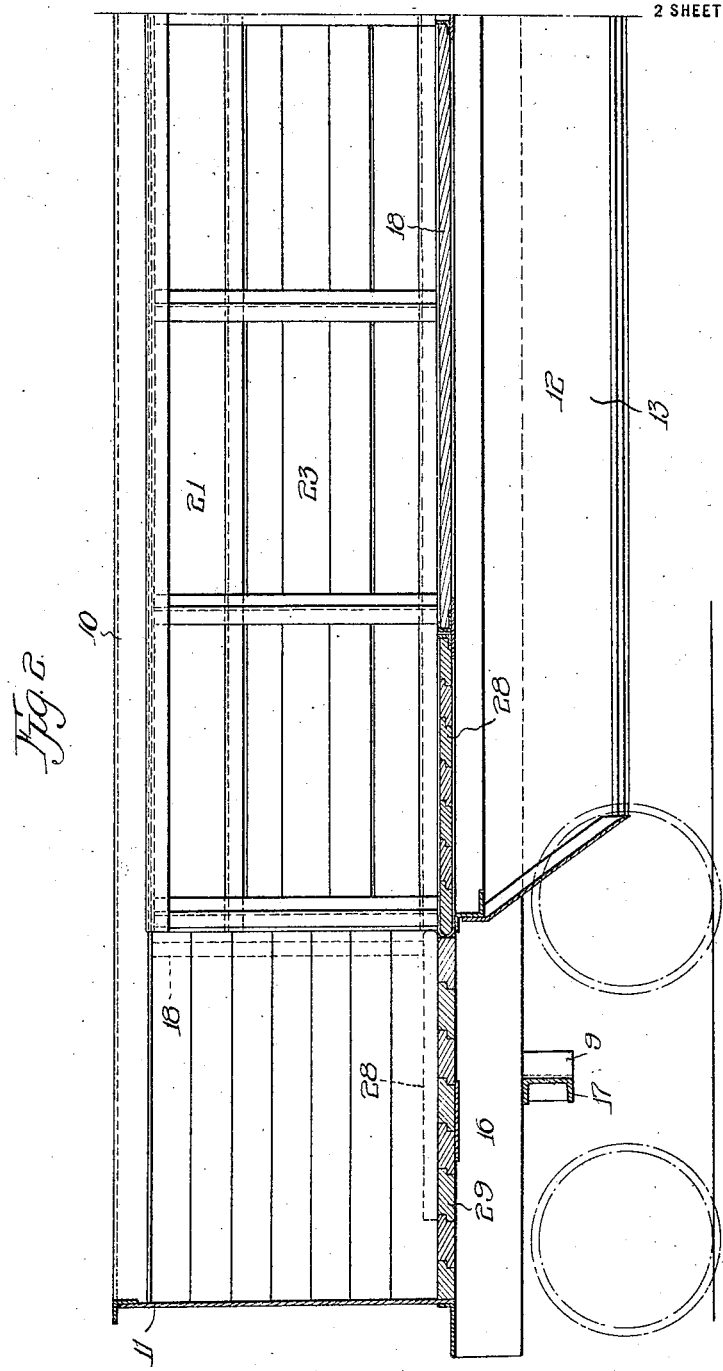

WILLIAM J. HOSCEIT, OF CHICAGO, ILLINOIS, ASSIGNOR TO RODGER BALLAST CAR CO., OF CHICAGO, ILLINOIS, A CORPORATION OF MAINE.

CONVERTIBLE CAR.

1,402,424.  Specification of Letters Patent.  Patented Jan. 3, 1922.

Application filed August 9, 1919. Serial No. 316,279.

*To all whom it may concern:*

Be it known that I, WILLIAM J. HOSCEIT, a citizen of the United States, residing at Chicago, in the county of Cook and State of Illinois, have invented certain new and useful Improvements in Convertible Cars, of which the following is a specification.

This invention relates to convertible cars. When dump cars are loaded, it is not always known whether it is desirable to center or side dump the load. In the early Hart convertible car, when the car is arranged with a flat bottom, the load is dumpable only to the sides of the car, and when arranged as a hopper type of car, the load is dumpable centrally only. There are certain advantages in being able to side dump a portion of the load when the car is arranged as a hopper central dump type, for instance, in ballast work.

Accordingly, one object of my invention is to make it possible to dump a load to the sides of a convertible car in addition to centrally dumping the load, especially when the car is arranged as a hopper central dump car.

Another object is to provide a simple convertible car construction arranged for selectively dumping a load in a manner to meet operating requirements.

These and other objects are accomplished by means of the car construction disclosed on the accompanying sheet of drawings, in which:—

Figure 1 is a transverse sectional view of a convertible car embodying my invention; and Figure 2 is a longitudinal sectional view of the same car.

The various novel features of the invention will be apparent from the following description and drawings, and will be particularly pointed out in the appended claims.

Referring to the figures of the drawings, it will be noted that I have shown a convertible car having sides 10, including side stakes 9, ends 11 and a bottom, the central portion of which is in the form of a hopper 12, having a stationary sloping side 13 and a movable sloping side or door 14, which may be operated by any suitable mechanism 15 and by means of which a load may be dumped centrally. This hopper 12 is located intermediate the longitudinally extending sills 16, which preferably are continuous, said sills being mounted over and supported by continuous cross beams 17 which connect the sides of the car for transmitting the load thereto.

When the car is used as a flat bottom car, the central hopper 12 is covered partially by members 18, which act as hopper ends when the car is arranged as a hopper car, as shown in dotted lines in Figure 2, it being understood that there is a hopper end wall 18 at each end of the hopper, said walls being spaced from the permanent ends 11 of the car. By using the hopper ends 18 as flat floor portions to cover the hopper, the loading space of the car is unobstructed. The remaining portion of the hopper 12 at each end is covered by a movably mounted member 28 which when the car is used as a hopper car is moved over upon the floor end portion 29, as shown in dotted lines in Figure 2. On each side of the hopper portion the floor is composed of doors 19 pivotally connected to the sill construction 16, said doors being provided with any suitable mechanism 20, whereby the doors may be raised into closed position after having been opened for side dumping purposes.

The sides of the car also include members 21 which, when the car is arranged as a flat bottom car, occupy a vertical position adjacent the stakes 9, as shown at the right hand side of the figure. These sides, however, may be moved into an inclined position, as shown at the left hand side of the figure, in which position they form continuations of the inclined hopper walls. These members 21 may be supported in their inclined position in any suitable manner, such as by brackets 22.

Heretofore, when the members 21 have been arranged in an inclined position for central dumping, it has been impossible to dump any of the load to the sides of the car. In ballast work, it is desirable at times to dump some of the load sidewise, as well as centrally. Accordingly, I have provided side members with doors 23, which are pivoted at 24 at their upper ends, and which normally are supported in closed or inclined position by supporting legs 25 pivotally connected to the lower end of the doors and each provided with a stop portion 26 for engaging the door, which limits the movement of the leg 25 in a downward direction. This leg in each case preferably rests in a grooved-out portion 27 in the associated floor door 19.

It is apparent, therefore, that if the floor doors 19 are permitted to swing downwardly into an open position, the doors 23 in the side members 21 will be moved into an open position as a result of the load in the car, whereupon a portion of the load will be dumped to the sides of the car after having been discharged past doors 23 and 19 successively. Of course it is appreciated that the load may be dumped centrally of the car by permitting the hopper door 14 to be moved into an open position. If it is desired to dump all of the load centrally, the same may be done by maintaining the doors 23 in the members 21 in a closed position.

It is my intention to cover all modifications of the invention falling within the spirit and scope of the appended claims.

I claim:

1. A convertible car having sides and a bottom, the latter of which has a hopper portion, said car sides being movable into a position to form hopper sides and having doors therein whereby dumpable material may be discharged to the sides of the car.

2. A convertible car having a bottom with a hopper portion, and a car side member which in one position forms a hopper side and which has a door whereby dumpable material may be discharged to the side of the car.

3. A car of the class described, having a bottom with a hopper portion whereby a load may be dumped centrally, and a car hopper side member having a door therein movable into an open position for dumping a portion of the load to the side of the car.

4. A convertible car having a bottom with a hopper portion, floor doors mounted adjacent said hopper portion, and car side members movable into a position to form hopper side portions and having doors co-operating with the floor doors for dumping a portion of the load to the sides of the car.

5. A convertible car having a bottom with a hopper portion, floor doors mounted adjacent said hopper portion, car side members movable into a position to form hopper side portions and having doors co-operating with the floor doors for dumping a portion of the load to the sides of the car, and means whereby the doors in the car sides are supported in closed position by said floor doors.

Signed at Chicago, Illinois, this 31st day of July, 1919.

WILLIAM J. HOSCEIT.